S. DUER.
HAND WARM OR GRIP FOR STEERING WHEELS.
APPLICATION FILED FEB. 11, 1920.
1,385,527.
Patented July 26, 1921.
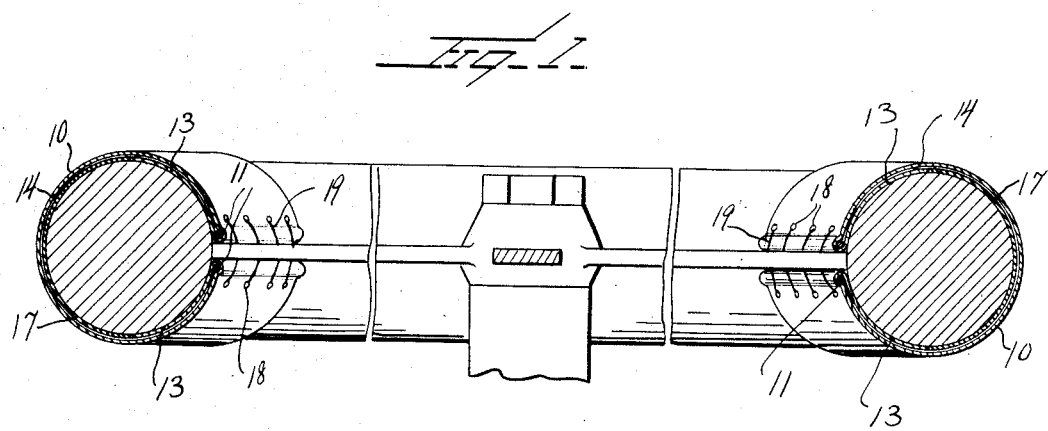
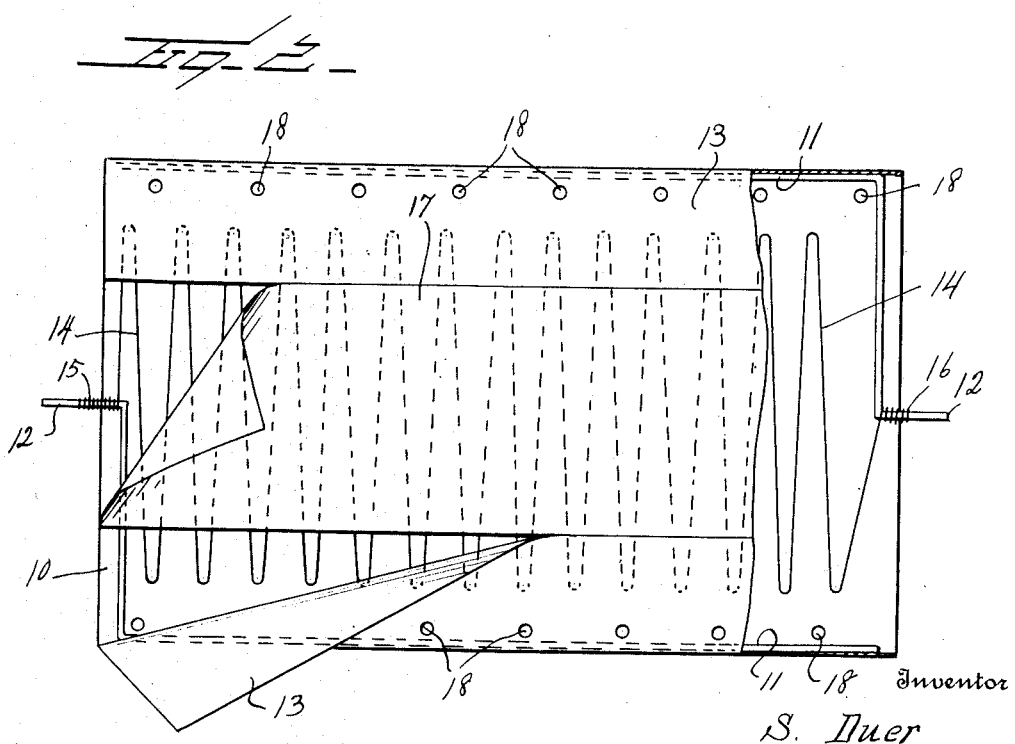
Inventor
S. Duer
By Watson E. Coleman
Attorney

UNITED STATES PATENT OFFICE.

SOLON DUER, OF ST. PARIS, OHIO.

HAND WARM OR GRIP FOR STEERING-WHEELS.

1,385,527.

Specification of Letters Patent.   Patented July 26, 1921.

Application filed February 11, 1920. Serial No. 357,972.

*To all whom it may concern:*

Be it known that I, SOLON DUER, a citizen of the United States, residing at St. Paris, in the county of Champaign and State of Ohio, have invented certain new and useful Improvements in Hand Warms or Grips for Steering-Wheels, of which the following is a specification, reference being had to the accompanying drawings.

This invention relates to devices adapted to be attached to the steering wheels of automobiles for the purpose of warming or keeping warm the hands of the operator, and a general object of the invention is to provide a very simple and convenient device which may be applied to any ordinary steering wheel and readily engaged therewith and which is in the nature of an electrically heated pad.

A further object of the invention is to provide a device of this kind which can lie out flat so that it may be readily packed, and which may be readily applied to the steering wheel and readily conform thereto.

A further object of the invention is to provide a construction of this character which may be cheaply made and which has been found thoroughly efficient and practical.

My invention is illustrated in the accompanying drawings, in which:

Figure 1 is a diametrical section of a steering wheel with my heating pad applied thereto;

Fig. 2 is an inside plan view of the pad partly broken away to show the interior construction.

Referring to these drawings, it will be seen that my improved grip comprises a strip 10 of fabric which is coated with a vulcanizing gum. Disposed upon this strip and extending longitudinally thereof is a reinforcing wire 11, which at one end is laterally bent to the middle of the strip and extends outward therefrom as at 12. The strip or web 10 is so formed that the margins 13 of the strip are adapted to be folded over upon the body of the strip or web and when so folded over, the reinforcing wire 11 is disposed longitudinally along the edge of the completed grip.

Disposed upon the face of the web or fabric 10 is an electrically energized heating element 14 of resistance wire. This wire is bent back and forth to form a number of convolutions extending parallel to each other and the extremities of the wire forming the heating unit, and extending out at the ends of the grip as at 15 and 16. One of the wires 11 has its extremity 12 extending out at one end of the grip while the other wire 11 has its extremity 12 extending out of the other end of the grip, and the extremities of the wire forming the heating element 14 are designed to be wrapped around this heavier gage wire 11 in the manner illustrated in Fig. 2. The margins 13 of the web 10 do not preferably meet, but the inner edges of these flaps 13 are spaced from each other, and filling the gap between these edges is a strip 17 of semi-cured or cement-coated rubber as may be preferred, which extends from the end of the grip or warmer. The side of the grip or warmer having the semi-cured strip 17 is placed next to the rim of the steering wheel, the rubber strip 17 adhering more or less closely to the rim of the steering wheel and preventing slipping of the device, thus eliminating the necessity of using tacks or screws which would tend to mutilate the wheel and mar its appearance which would be liable to tear out and which would be unpleasant for the driver. This semi-cured strip 17 by its sticking to the wheel prevents any slippage of the grip on the wheel.

It will be, of course, understood that the margins 13 of the web 10 are to be folded over upon the ends of the coils of the heating element and are to be vulcanized to the heating element with the reinforcing wires 11 in position, thus holding the heating element and reinforcing wires in proper place, making it impossible for any short-circuit to occur and protecting the heating element from contact with the fingers of the operator. The side edges of the grip, as illustrated in Fig. 2, are formed with perforations or eyelets 18 through which laces 19 are passed, whereby the device may be held on the wheel as illustrated in Fig. 1.

This grip or warmer may be of any suitable length, and may be of sufficient size to cover all or most of the wheel, or the device may be made relatively short and only cover that portion of the wheel against which the fingers of the operator engage. This device not only supplies heat, thus warming the fingers of the operator and the palms of his hands, but it also provides a comfortable grip, eliminating the necessity of a leather cover which is often placed on steering wheels so that the operator can grip on the wheel.

It will be obvious that the thickness of the combined grip or warmer will depend upon the gage of fabric which is used. It will be understood that the eyelets or eyes 18 may be either in the form of perforations extending through the margins of the fabric or they may be reinforced with metal eyelets inasmuch as the perforations 18 are disposed relatively close to the reinforcing wires, and it is obvious that the strain on the laces will not act to tear the fabric out at these points. It will be seen that I have provided a grip or warmer for steering wheel rims which may be made very thin and which is relatively soft to the hand and which will warm the hand of the operator. It is composed of very few parts, is easy to manufacture and is simple of application.

I claim:

1. A heating device for steering wheel rims, comprising a web of flexible rubberized fabric having its margins folded over upon the body of the fabric, reinforcing wires extending longitudinally between said folded over margins and the body of the fabric and disposed adjacent the fold, and a heating element disposed between the body and said margins of the fabric and adapted to be connected at its extremities to a source of current.

2. A heating device for wheel rims consisting of a plurality of layers of soft flexible rubberized fabric, heat wire of resistance material extending through said layers in the form of a plurality of transverse convolutions and adapted at its ends to be connected to a source of current, means for holding the device in place on a steering wheel rim, and a strip of relatively adhesive rubberized fabric disposed upon the inner face of the device and adapted to contact with the wheel rim.

In testimony whereof I hereunto affix my signature.

SOLON DUER.